Oct. 5, 1971

D. I. McDONALD 3,609,816

HYDRAULIC CLAMPING MECHANISM

Filed Feb. 20, 1970

INVENTOR.
DAVID I. McDONALD
BY
ATTORNEYS

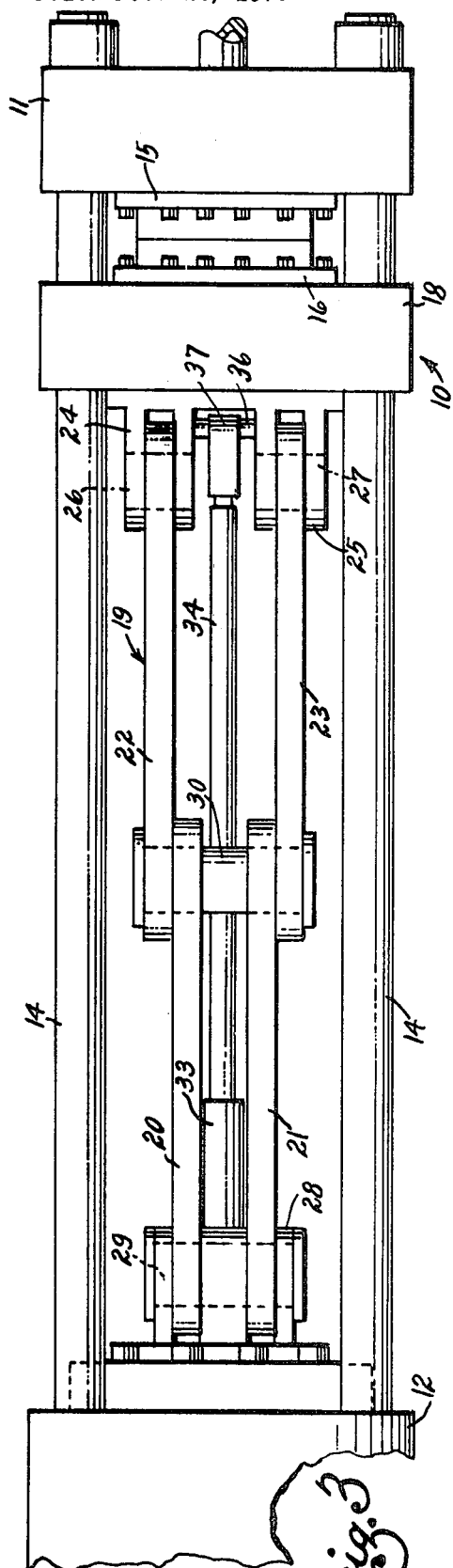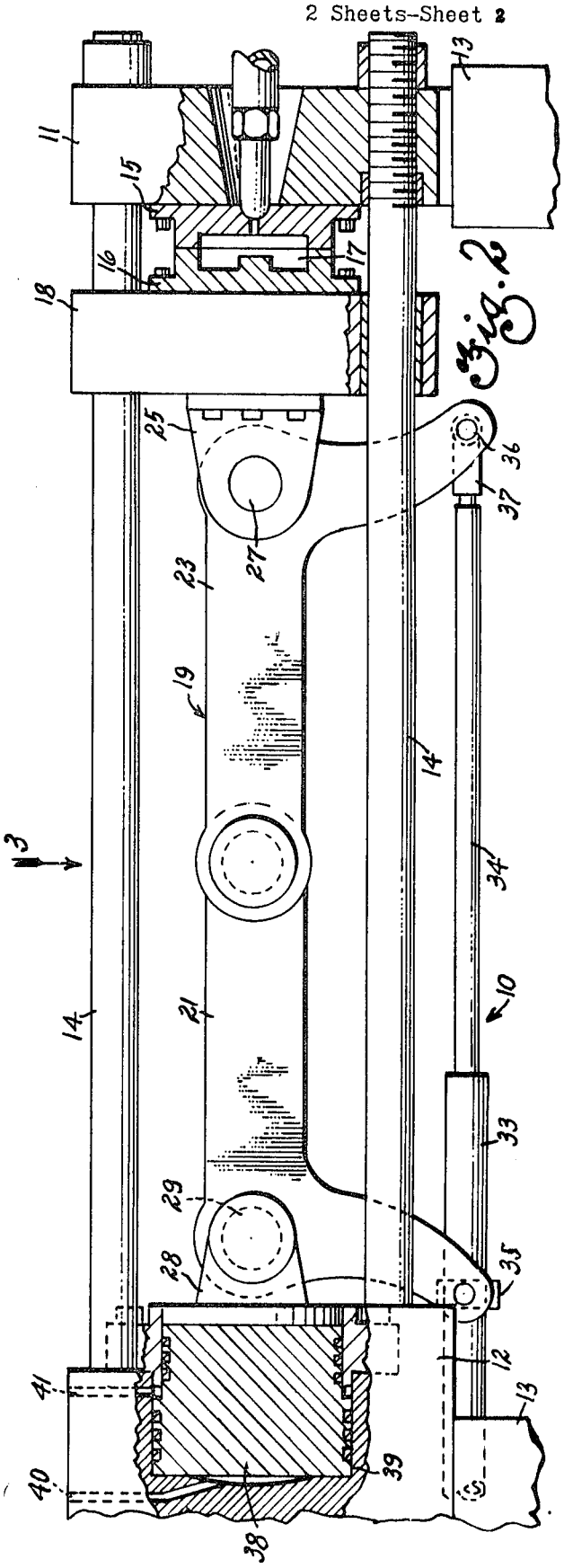

United States Patent Office 3,609,816
Patented Oct. 5, 1971

3,609,816
HYDRAULIC CLAMPING MECHANISM
David I. McDonald, Cincinnati, Ohio, assignor to The
Cincinnati Milling Machine Co., Cincinnati, Ohio
Filed Feb. 20, 1970, Ser. No. 13,032
Int. Cl. B29f *1/00*
U.S. Cl. 18—30 LT          6 Claims

ABSTRACT OF THE DISCLOSURE

A mechanism for bringing a movable platen of molding machine into cooperative engagement with a stationary platen and in which a pair of links is provided, one of which is attached to a substantially stationary structure and the other of which is attached to the movable platen. The links are joined at one end thereof and at their opposite ends one link is connected to a cylinder and the other link is connected to a piston rod so that upon application of hydraulic pressure to the cylinder, the piston is caused to move, thereby moving the movable platen toward or away from the stationary platen. The piston and cylinder are so disposed that the force thereby provided is in a direction substantially parallel to the path of travel of the movable platen. Additionally, one of the links can be pivotally connected to the end of a large clamping piston which serves to increase the force between the cooperating elements once the link system has reached the full extent of its travel.

BACKGROUND OF THE INVENTION

This invention relates to hydraulically operated clamping mechanisms and, more particularly to a link-type clamp actuating mechanism wherein the link permits controlled travel of a movable element with respect to a cooperating, stationary element.

In hydraulically actuated clamping devices used on molding machines, such as, for example, die-casting machines or injection molding machines, a movable platen is brought into cooperative engagement with a stationary platen by means of a hydraulically actuated press device which both moves the movable platen and holds it in position. At times these actuating devices are completely hydraulic and comprise merely a piston and cylinder, the cylinder being connected to a stationary structure and the piston connected to the movable platen.

Another approach toward moving the movable portion of the mold element is by means of a toggle-type link system comprising a pair of links joined at one end and having their free ends attached to the movable platen and to a stationary structure, respectively. The toggle has the advantage of imparting a relatively rapid initial velocity to the movable platen toward the stationary platen when the two are widely separated. However, the movable platen approaches the stationary platen, the geometry of the toggle is such that it reduces the velocity of the movable platen up until the point where the toggle has been fully extended, whereupon the movable platen stops. The usual method for actuating such a toggle mechanism is by means of a hydraulic cylinder and piston which are frequently positioned such that the path of travel of the piston and piston rod are in a direction substantially perpendicular to the path of travel of the movable member. That particular arrangement requires a very large hydraulic cylinder since the principal components of the force do not act in the direction of motion of the movable platen. Additionally, stronger structural elements are required because of the larger side loads which such an arrangement imposes, both on the interconnection between the links and the members to which they are attached, including the movable platen, which is generally guided on tie-rods. Since the direction of the force tends to tilt the movable platen with respect to the tie-rods, large, high-force-capacity bearings are required in order to permit the proper orientation of the movable platen so that it can move satisfactorily along the tie-rods.

Although link systems such as the toggle arrangement hereinabove described have been used for moving a movable mold member into cooperative engagement with a stationary mold member, the prior art link systems have required either a large number of pivotally connected, individual link members, or they have applied the actuation force in a direction other than the direction in which the movable mold member is to travel, thereby unduly complicating the link system and requiring substantially stronger and, therefore, heavier parts, all of which unnecessarily increase both the inertia and the cost of the system.

It is an object of the present invention to obviate the above-described difficulties.

SUMMARY OF THE INVENTION

Briefly stated, in accordance with one aspect of the present invention, a hydraulic clamping mechanism is provided for moving one of a pair of cooperating members into and out of cooperative engagement with the other, stationary member. The mechanism comprises a pair of link members which are pivotally interconnected at one end thereof with the other ends of the links connected to a cylinder and a piston rod, respectively. Each of the link members comprises a pair of rigidly connected and obliquely positioned arms. One of the link members is pivotally connected at a point between the ends thereof to the movable member while the other link member is pivotally connected at a point between the ends thereof to the stationary member. The piston rod and cylinder are attached to the free ends of the links and are so disposed that the force which results when hydraulic pressure is applied thereto acts in a direction substantially parallel to the path of travel of the movable element.

BRIEF DESCRIPTION OF THE DRAWINGS

FIG. 2 is a fragmentary elevational view similar to that of FIG. 1 except that the mold closure mechanism has been fully extended and the molds are closed, thereby defining a mold cavity.

FIG. 3 is a fragmentary top view of the mechanism shown in FIG. 2.

DESCRIPTION OF THE PREFERRED EMBODIMENTS

Figure 1:
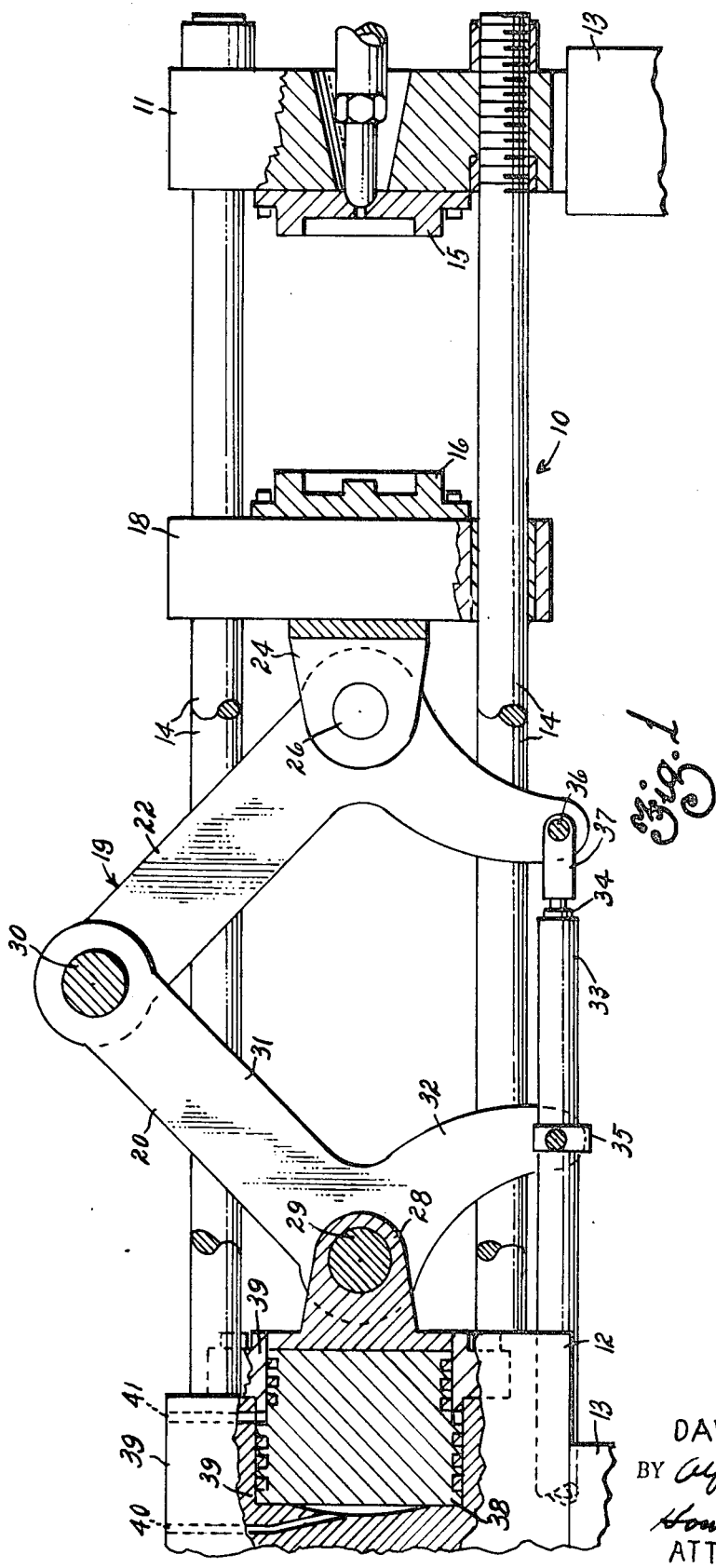
FIG. 1 is a fragmentary elevational view of a portion of an injection molding machine, partially in section, showing the mold closure mechanism of the present invention in its operative environment and in an open position.

Referring now to the drawings and particularly to FIG. 1 thereof, there is shown a portion of an injection molding machine 10 including a first stationary member 11 and a second stationary member 12, of which is positioned on a base 13 and interconnected by means of a plurality of tie-rods 14 which extend therebetween. Second stationary member 12 and base 13 each includes a longitudinal recessed portion to permit a hydraulic cylinder to move downwardly and to the left while operating the mechanism of this invention in the manner hereinafter described. A first or stationary mold portion 15 is securely connected to the first stationary member 11, which constitutes a stationary platen, while a second or movable mold portion 16, which cooperates with the first mold portion 15 to define a mold cavity 17 (see FIG. 2), is securely positioned on a moving platen 18 which is slidably positioned on tie-rods 14. The portion of the injection molding machine shown is essentially the clamp section of the machine and provides the mechanism for moving the movable platen relative to the stationary platen and for holding the mold halves together while the hot, molten plastic is forcibly injected into the mold cavity defined by the mold halves. Only a portion of the injection nozzle of the injection section is shown because the construction of that portion of the machine is well known to those skilled in the art.

Movable platen 18 is caused to move back and forth toward and away from stationary platen 11 by means of a link system 19 which comprises link member 20, 21, 22 and 23 as shown in FIGS. 1 and 3. The links are arranged in pairs, one pair comprising links 20 and 21 while the other pair comprises links 22 and 23. Links 22 and 23 are each pivotally connected to a pair of clevises 24, 25, respectively, which are formed on the rear surface of movable platen 18, as by means of pins 26, 27, respectively; links 20 and 21 are pivotally connected to clevis 28 which is secured to stationary member 12, by means of pin 29. The pivotal connections of link members 22 and 23 to movable platen 18 and link members 20 and 21 to stationary member 12 are at points on the link members spaced from the respective ends thereof to provide the lever arms necessary to operate the link system. In addition, the two pairs of link members 22, 23, and 20, 21 are pivotally connected together at one end thereof by means of pin 30.

Link members 20, 21, 22, and 23 are similarly configured and each comprises a pair of rigidly connected arms which are positioned obliquely to each other. As shown in FIG. 1, link 20, for example, comprises a toggle arm 31 and a force arm 32 and the other link members are similar. As used herein, the term "oblique" as applied to the orientation of the link arms is intended to refer to the included angle between the links, which is less than 180° and can be 90°.

Preferably, the included angle between the links ranges from 80° to 160°. At the ends of the links opposite the ends which are pivotally interconnected, one pair of force arms is connected to a cylinder 33, while the other pair of force arms is connected to a piston rod 34 which is attached to a double acting piston (not shown) that moves axially within cylinder 33. As best seen in FIG. 1, cylinder 33 and piston rod 34 are so arranged with respect to the force arms of links 20, 21, 22 and 23 that the force resulting from the application of hydraulic pressure to cylinder 33 acts in a direction which is substantially parallel to tie-rods 14 and thus also parallel to the path of travel of movable platen 18, thereby permitting a smaller capacity cylinder to be utilized than would be the case if the cylinder were positioned to act in different direction, as, for example, perpendicularly. The reason the required force is less is that the force imposed by cylinder 33 acts in the direction of motion and, therefore, substantially all the force is utilized to move movable platen 18 and is not applied at a different angle, which would result in a large portion of the force not being applied to move movable platen 18 along tie-rods 14.

As is apparent from FIG. 2, the sizes of the arms of links 20, 21, 22 and 23 influence both the force applied to movable platen 18 and the distance it moves. The lengths of the interconnected toggle arms of the link system define the extent of lateral travel of moving platen 18, while the lengths of the force arms connected to cylinder 33, and piston rod 34, and also the size of the cylinder and the hydraulic pressure applied to it, determine the force with which moving platen 18 is moved.

Cylinder 33 and piston rod 34 are also pivotally connected to link members 20, 21, 22, and 23 as shown in FIG. 1. Links 20 and 21 are pivotally connected to cylinder 33 by means of pins which extend radially from a circumferential clamp 35 which, in turn, surrounds a portion of cylinder 33. Links 22 and 23 are pivotally connected to piston rod 34 by means of pivot pin 36 which passes through an aperture in piston rod extension 37. When hydraulic pressure is applied to cylinder 33, the piston tends to move inwardly or outwardly and in a direction substantially parallel to the path of travel of movable platen 18, thus causing movable mold portion 16 to move out of or into cooperative engagement with stationary mold portion 15. Because of the link arrangement, the velocity profile of movable platen 18 is such that the velocity initially and for a substantial portion of its travel is relatively high; when movable platen 18 approaches stationary platen 11 the velocity decreases gradually, and when the link arms are fully extended, movable platen 18 is at rest in its most extreme position as shown in FIG. 2. When in the extreme position shown in FIG. 2, the toggle arms, which are interconnected, are collinear in their fully extended position. In this position, the force imparted by the cylinder acts to keep the movable platen in its extreme position, and the collinear alignment of the portions of the link arms in combination with the force of the cylinder is such as to preclude rearward movement of the movable platen when molten plastics are injected into mold cavity 17. Although the link system is shown in the form where two pairs of links are provided, each pair can be replaced with a single link, if desired.

The system hereinabove described can advantageously be applied to die-casting machines, injection molding machines, blow molding machines or any other apparatus where a pair of mold members must be brought together and held in cooperating relationship while a molten material is introduced into the cavity thereby formed. If additional force is necessary to hold the mold portions together while the molten material is introduced therein under high pressure, such as may exist in high-pressure plastics injection molding machines in which relatively large parts are being molded, an auxiliary clamping device can be provided to prevent the molds separating while plastic material is being injected therein. One form of such device is shown in FIGS. 1 and 2 as a relatively large diameter piston 38 which is of the double acting type, and which is capable of supplying a large clamping force to the mold portions tending to hold them in the closed position. Piston 38 can be so positioned that to ride within a cylinder 39 housed within a second stationary member 12, as shown, and can be connected to one of the pairs of arms of the link system. Separate ports, 40, 41 can be provided to permit communication between the forward or rear face of the clamping piston, as desired, and thus impart movement of the same either toward or away from first stationary member 11.

It can thus be seen that the actuation system hereinabove described provides a rapid travel, positive action, high clamping force hydraulic clamping mechanism eminently suitable for mold closing or other functions which require these attributes. Furthermore, while particular embodiments of the invention have been illustrated and described, it will be appararent to those skilled in the art that various changes and modifications can be made without departing from the spirit and scope of the invention, and it is intended to cover in the appended claims all such changes and modifications that are within the scope of this invention.

I claim:

1. In an injection molding machine wherein one of a pair of cooperating mold portions is positioned on a movable platen slidably positioned in a plurality of tie-rods extending between a stationary platen and a stationary structure spaced from said stationary platen, said stationary platen carrying said other mold portion, wherein said movable platen is reciprocable toward and away from said stationary platen to alternately bring said mold portions into and out of cooperative engagement, the improvement comprising:

(a) a pair of link members pivotally joined at one end thereof to form a toggle, one of said link members connected at its opposite end to the rod of a double acting piston and the other of said link members connected at its opposite end to a cylinder within which said piston and rod are slidably disposed, said piston and cylinder being positioned so that said piston moves in a path of travel substantially parallel to the path of travel of said movable member;

(b) each of said link members comprising a pair of arms rigidly interconnected and positioned obliquely with respect to each other one of said link members being pivotally attached to said movable member at a point between the opposite end of each of the arms thereof and the other of said link members being pivotally attached to said second stationary member at a point between the opposite ends of each of the arms thereof;

(c) whereby the application of hydraulic pressure to one side of said piston causes said movable member to move into cooperative engagement with said first stationary member and the application of hydraulic pressure to the opposite side of said piston causes said movable member to move out of cooperative engagement with said first stationary member.

2. The injection molding machine of claim 1 wherein the rigidly connected arms of each of said links form an included angle ranging from 80 degrees to 160 degrees.

3. The injection molding machine of claim 2 wherein each of said links is similarly configured.

4. The injection molding machine of claim 3 wherein the arms of each of said links are of unequal length and the longer arms are pivotally joined to form the toggle.

5. The injection molding machine of claim 4 wherein one of said links is pivotally connected to a clamping piston slidably positioned in said second stationary member.

6. The injection molding machine of claim 5 wherein said clamping piston is a double acting piston.

References Cited

UNITED STATES PATENTS

| | | | |
|---|---|---|---|
| 2,269,388 | 1/1942 | Weida | 18—30 LT |
| 2,358,686 | 9/1944 | Caron | 18—30 LT |
| 3,208,373 | 9/1965 | Bachelier. | |

H. A. KILBY, Jr. Primary Examiner